(12) United States Patent
Cherry et al.

(10) Patent No.: US 7,594,388 B2
(45) Date of Patent: Sep. 29, 2009

(54) COUNTERROTATING TURBOFAN ENGINE

(75) Inventors: David Glenn Cherry, Loveland, OH (US); Robert John Beacock, Cincinnati, OH (US); William Larson Clifford, Cincinnati, OH (US); Robert Joseph Orlando, West Chester, OH (US); Thomas Ory Moniz, Loveland, OH (US); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 917 days.

(21) Appl. No.: 11/145,848

(22) Filed: Jun. 6, 2005

(65) Prior Publication Data

US 2006/0288686 A1    Dec. 28, 2006

(51) Int. Cl.
*F02C 3/067* (2006.01)
*F02K 3/072* (2006.01)

(52) U.S. Cl. ............... 60/226.1; 60/268; 60/39.162

(58) Field of Classification Search ......... 60/226.1, 60/268, 39.162; 415/60, 65, 62; 416/128, 416/129
See application file for complete search history.

(56) References Cited

U.S. PATENT DOCUMENTS

| 2,662,553 | A |   | 12/1953 | Dimmock |
| 2,724,546 | A |   | 11/1955 | Barrett et al. |
| 2,766,963 | A |   | 10/1956 | Zimmerman |
| 2,931,625 | A |   | 4/1960 | Lechthaler et al. |
| 3,635,586 | A |   | 1/1972 | Kent et al. |
| 3,807,891 | A |   | 4/1974 | McDow et al. |
| 3,823,553 | A |   | 7/1974 | Smith |
| 3,854,842 | A |   | 12/1974 | Caudill |
| 3,903,690 | A | * | 9/1975 | Jones ................ 60/226.1 |
| 4,131,387 | A |   | 12/1978 | Kazin et al. |
| 4,277,225 | A |   | 7/1981 | Dubois et al. |
| 4,543,036 | A |   | 9/1985 | Palmer |
| 4,553,901 | A |   | 11/1985 | Laurello |
| 4,714,407 | A |   | 12/1987 | Cox et al. |
| 4,809,498 | A | * | 3/1989 | Giffin et al. ........... 60/39.162 |
| 4,826,400 | A |   | 5/1989 | Gregory |
| 5,131,814 | A |   | 7/1992 | Przytulski et al. |
| 5,207,556 | A |   | 5/1993 | Frederick et al. |
| 5,307,622 | A | * | 5/1994 | Ciokajlo et al. ........ 60/39.162 |
| 5,327,716 | A |   | 7/1994 | Giffin et al. |

(Continued)

OTHER PUBLICATIONS

Sharma et al, "Energy Efficient Engine, Low-Pressure Turbine Subsonic Cascade, Component Development and Integration Program," NASA CR-165592, Jan. 1982, pp. Cover, i, iii-xi, 1-17 and 79.

(Continued)

*Primary Examiner*—Ted Kim
(74) *Attorney, Agent, or Firm*—Williams S. Andes; Francis L. Conte

(57) ABSTRACT

A turbofan engine includes a fan, compressor, combustor, high pressure turbine, and low pressure turbine joined in serial flow communication. The high pressure turbine includes two stages of rotor blades to effect corresponding exit swirl in the combustion gases discharged therefrom. A transition duct includes fairings extending between platforms for channeling the combustion gases to the low pressure turbine with corresponding swirl. First stage rotor blades in the low pressure turbine are oriented oppositely to the rotor blades in the high pressure turbine for counterrotation.

21 Claims, 3 Drawing Sheets

U.S. PATENT DOCUMENTS

| | | | |
|---|---|---|---|
| 5,354,174 | A | 10/1994 | Balkcum et al. |
| 5,357,744 | A | 10/1994 | Czachor et al. |
| 5,443,590 | A | 8/1995 | Ciokajlo et al. |
| 5,569,018 | A | 10/1996 | Mannava et al. |
| 5,741,117 | A | 4/1998 | Clevenger et al. |
| 5,996,331 | A | 12/1999 | Palmer |
| 6,183,193 | B1 | 2/2001 | Glasspoole et al. |
| 6,353,789 | B1 | 3/2002 | Hanson |
| 6,508,630 | B2 | 1/2003 | Liu et al. |
| 6,684,626 | B1 | 2/2004 | Orlando et al. |
| 6,883,303 | B1* | 4/2005 | Seda .......................... 60/226.1 |
| 7,258,525 | B2 | 8/2007 | Boeck |
| 2003/0163984 | A1 | 9/2003 | Seda et al. |
| 2004/0168443 | A1* | 9/2004 | Moniz et al. .................. 60/796 |

OTHER PUBLICATIONS

GE Aircraft Engines, "GE/Rolls_Royce JSF F136 Program Details", http://www.geae.com/aboutgeae/presscenter/military/military_20020722g.html, May 31, 2005, 2 pages.

Rolls-Royce, "Trent 900," http://www.rolls-royce.com/civil_aerospace/products/airlines/trent900/technology_flash.jsp, copyright 2004, single page.

Pratt & Whitney, "PW6000," PW6000 http://www.pratt-whitney.com/presskit/images/pw6000_cutaway_high.jpg, website date before, Jun. 1, 2005, single page.

Rolls-Royce, "Trent 900," http://www.rolls-royce.com/civil_aerospace/downloads/airlines/trent_900.pdf, Feb. 2005, single page.

Pratt & Whitney, P & W Energy Efficient Engine, cross section, publicly available in the 1980's, single page.

T. Moniz, U.S. Appl. No. 10/976,495, filed Oct. 29, 2004.

J. Seda et al, U.S. Appl. No. 10/976,523, filed Oct. 29, 2004.

T. Moniz et al, U.S. Appl. No. 10/976,496, filed Oct. 29, 2004.

R.J. Orlando et al, U.S. Appl. No. 11/145,837, filed Jun. 6, 2005.

T.O. Moniz et al, U.S. Appl. No. 11/145,875, filed Jun. 6, 2005.

* cited by examiner

COUNTERROTATING TURBOFAN ENGINE

BACKGROUND OF THE INVENTION

The present invention relates generally to gas turbine engines, and, more specifically, to aircraft turbofan engines.

Gas turbine engines have evolved into many configurations for powering various forms of commercial and military aircraft. The typical turbofan engine includes in serial flow communication a fan, compressor, combustor, high pressure turbine (HPT), and low pressure turbine (LPT).

Air enters the engine and is pressurized by the fan and compressor and mixed with fuel in the combustor for generating hot combustion gases. Energy is extracted from the combustion gases in the HPT which powers the compressor through an interconnecting shaft. Additional energy is extracted from the combustion gases in the LPT which powers the fan through a second shaft.

The fan is typically disposed inside a fan nacelle that defines a substantially annular bypass duct around the cowl which surrounds the core engine. Air pressurized by the fan blades is split radially with an inner portion being channeled through the compressor of the core engine, and an outer portion being channeled through the bypass duct, and therefore bypassing the core engine. Propulsion thrust is generated by the pressurized fan air bypassing the core engine as well as by the hot combustion gases discharged from the core engine.

Turbofan engines may be low or high bypass depending upon the amount of fan air bypassing the core engine. Modern turbofan aircraft engines powering commercial aircraft in flight are typically high bypass engines with relatively large, single stage fan blades mounted inside the nacelle and powered by a multistage LPT. The HPT may have a single stage or multiple stages therein and cooperates with the multiple stages of the LPT for maximizing energy extraction from the combustion gases to power the fan and compressor.

The compressor in a modern turbofan engine is typically a multistage axial high pressure compressor directly driven by the rotor or shaft of the HPT. And in some configurations, a multistage, axial booster or low pressure compressor is disposed between the fan and high pressure compressor and joined to the fan shaft or rotor powered by the LPT.

The compressors and turbines have various stages or rows of rotor blades extending radially outwardly from supporting rotor spools or disks joined together by the corresponding rotors or shafts. Each stage or row of rotor blades typically cooperates with an upstream row or stage of stator vanes.

Stator vanes and rotor blades have corresponding airfoil configurations which cooperate for pressurizing the air in the compressor and expanding the combustion gases in the turbines for extracting energy therefrom. Each airfoil has a generally concave pressure side and an opposite, generally convex suction side extending radially in span between axially opposite leading and trailing edges.

The nominal curvature of the airfoil is represented by the camber line extending between the leading and trailing edges. And, the concave pressure side and convex suction side are specifically configured for providing the desired pressure distributions thereover for maximizing efficiency of air compression in the compressor and gas expansion in the turbines.

The rotors of the HPT and LPT typically rotate in the same direction, or co-rotate, and the angular or twist orientation of the vanes and blades in the compressor and turbines typically alternate between the airfoil rows as the flow streams are turned in their tortuous path through the engine.

Each vane and blade row has a corresponding total number of airfoils therein required for efficiently turning the flow streams under the aerodynamic loading therefrom. Each row typically has a substantial number or multitude of airfoils around the circumference thereof dictated by the aerodynamic loading requirements of each stage and the turning or swirling of the flow streams axially therethrough.

For example, a single stage high pressure (HP) turbine typically has a substantial amount of exit swirl of the combustion gases, for example about 25 degrees. Correspondingly, the first stage low pressure (LP) turbine nozzle has vanes with substantial curvature or camber for efficiently turning the high swirl discharge flow from the HPT.

In a two stage HPT, the second stage HP blades typically have corresponding camber and angular orientation or twist relative to the axial centerline axis of the engine for effecting nearly zero swirl at the exit of the HPT. Correspondingly, the first stage LP nozzle vanes will have suitable camber and twist for efficiently channeling the combustion gases to the first stage LP blades.

Modern turbofan engines presently used for powering commercial aircraft in flight enjoy high operating efficiency due to the many advancements in design of the various components thereof over many years of development and commercial use in service. Since the engines power aircraft in flight, the size and weight of the engines themselves are ever paramount design objectives along with maximum efficiency of operation. The cost of jet fuel continually increases, and the need to further maximize efficiency of turbofan engines and reduce fuel consumption becomes ever more challenging in modern aircraft engine design.

Accordingly, it is desired to provide a turbofan aircraft engine having further improvement in efficiency in the turbine stages thereof.

BRIEF DESCRIPTION OF THE INVENTION

A turbofan engine includes a fan, compressor, combustor, high pressure turbine, and low pressure turbine joined in serial flow communication. The high pressure turbine includes two stages of rotor blades to effect corresponding exit swirl in the combustion gases discharged therefrom. A transition duct includes fairings extending between platforms for channeling the combustion gases to the low pressure turbine with corresponding swirl. First stage rotor blades in the low pressure turbine are oriented oppositely to the rotor blades in the high pressure turbine for counterrotation.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
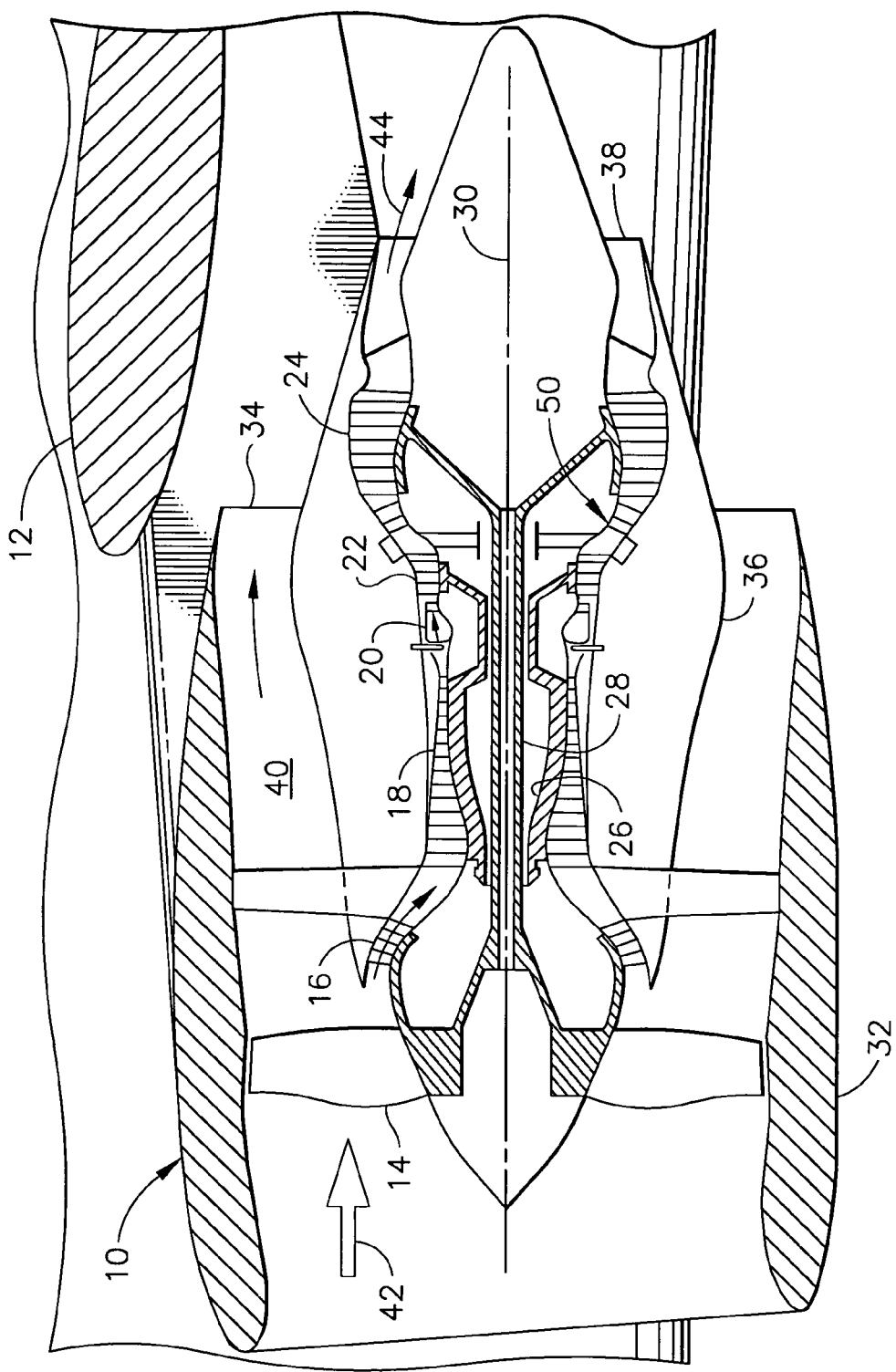
FIG. 1 is a partly sectional axial view of aircraft turbofan gas turbine engine mounted to the wing of aircraft.

Illustrated schematically in FIG. 1 is a turbofan engine 10 mounted to the wing 12 of aircraft for providing propulsion thrust therefor. The engine includes in serial flow communication a fan 14, low pressure or booster compressor 16, multistage high pressure axial compressor 18, annular combustor 20, high pressure turbine (HPT) 22, and multistage low pressure turbine (LPT) 24.

The high pressure compressor 18 is joined to the HPT 22 by a first shaft or rotor 26, and the fan 14 and booster compressor 16 are joined to the LPT 24 by a second shaft or rotor 28 which are concentric with each other, and coaxial about a longitudinal or axial centerline axis 30 of the engine.

A fan nacelle 32 surrounds the fan 14 and extends aft therefrom to terminate at a distal end in a substantially annular fan outlet or nozzle 34. A core cowl 36 surrounds the compressors 16,18, combustor 20, HPT 22, and LPT 24, and has an annular core outlet or nozzle 38 which is spaced downstream or aft from the fan outlet 34.

The fan nacelle 32 is mounted outside the core cowl 36 by a conventional fan frame extending radially therebetween, with the nacelle and cowl being spaced apart radially to define a substantially annular bypass duct 40 terminating at the fan outlet 34 forward or upstream of the core outlet 38.

The basic turbofan engine 10 illustrated in FIG. 1 is conventional in configuration and operation, except as modified and described hereinbelow. During operation, ambient air 42 enters the inlet of the fan nacelle and is pressurized by the row of fan rotor blades in the fan 14. The air is then split radially in outer part through the bypass duct 40 and in inner part through the low and high pressure compressors 16,18 which further pressurize the air sequentially in turn to the combustor 20. Fuel is added to the pressurized air in the combustor and ignited for generating hot combustion gases 44 from which energy is extracted in the HPT 22 and LPT 24.

The exemplary engine has a high bypass ratio for the pressurized fan air 42 channeled through the bypass duct 40. The single stage fan 14 pressurizes the air for producing a majority of the propulsion thrust for the engine through the fan outlet 34. The inner portion of the fan air is further pressurized in the compressors for generating the hot combustion gases which are discharged through the core outlet 38 for providing additional thrust in powering the aircraft in flight.

The engine is axisymmetrical about the axial centerline axis 30 with a full row of fan blades extending radially outwardly from a supporting rotor disk at the forward end of the second rotor 28. The low and high pressure compressors 16,18 include corresponding rows of stator vanes and rotor blades through which the air is sequentially pressurized to the last stage thereof. The rotor blades of the booster compressor 16 are joined to the second shaft 28, whereas the rotor blades of the high pressure compressor 18 are joined to the first rotor 26.

Figure 2:
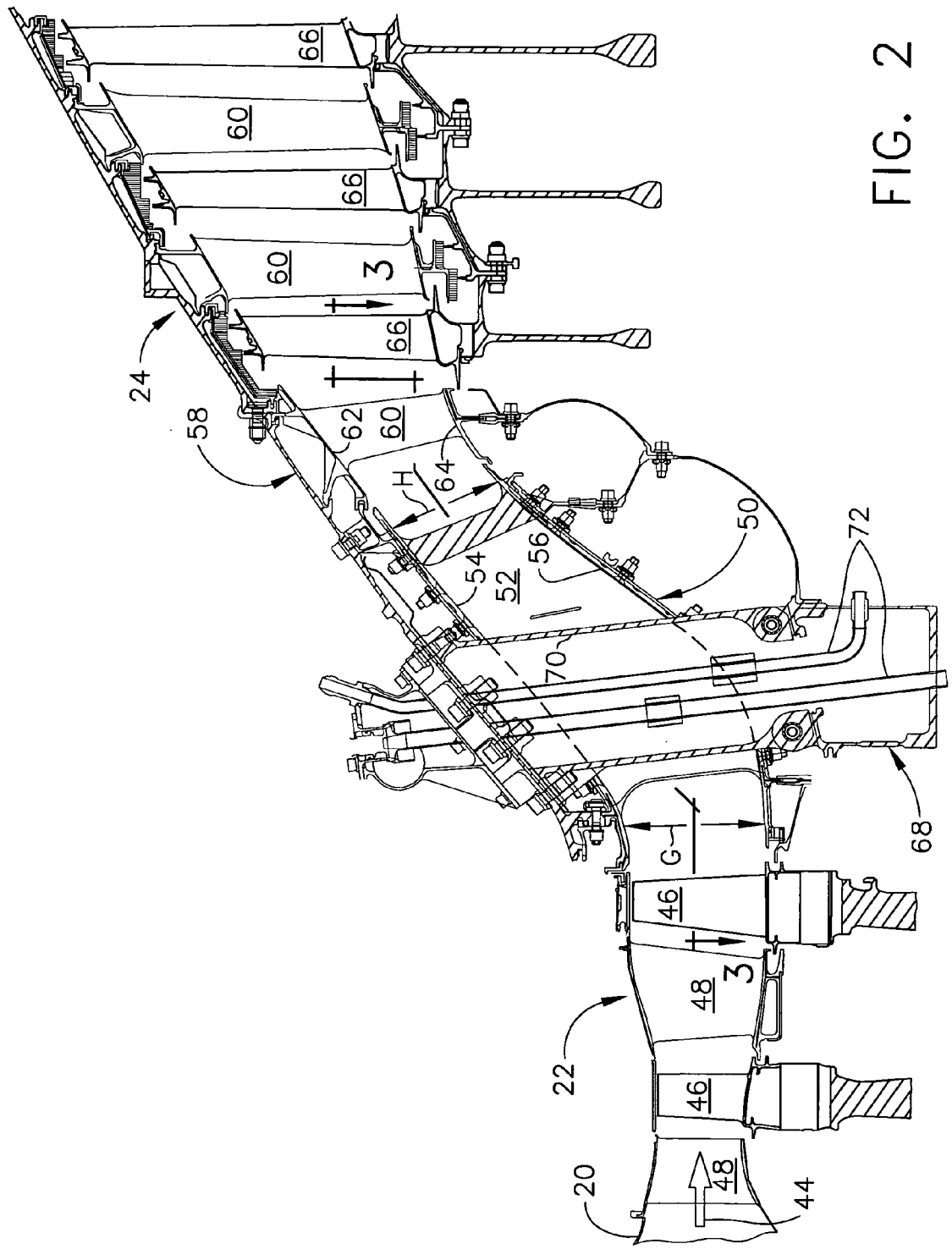
FIG. 2 is an enlarged elevation view of the turbine section of the engine illustrated in FIG. 1.

FIG. 2 illustrates in more detail the turbine section of the engine downstream from the discharge end of the annular combustor 20. The HPT 22 includes two rows or stages of high pressure (HP) rotor blades 46 extending radially outwardly from supporting disks which in turn are joined to the first rotor 26. Correspondingly, the HPT 22 also includes two corresponding turbine nozzles having rows of HP stator vanes 48 mounted radially between outer and inner bands.

The blades 46 and vanes 48 of the HPT 22 have airfoil configurations with generally concave pressure sides, and opposite, generally convex suction sides extending axially in chord between opposite leading and trailing edges, and radially in span over the flowpath through which the combustion gases 44 are channeled axially aft in the downstream direction.

Figure 3:
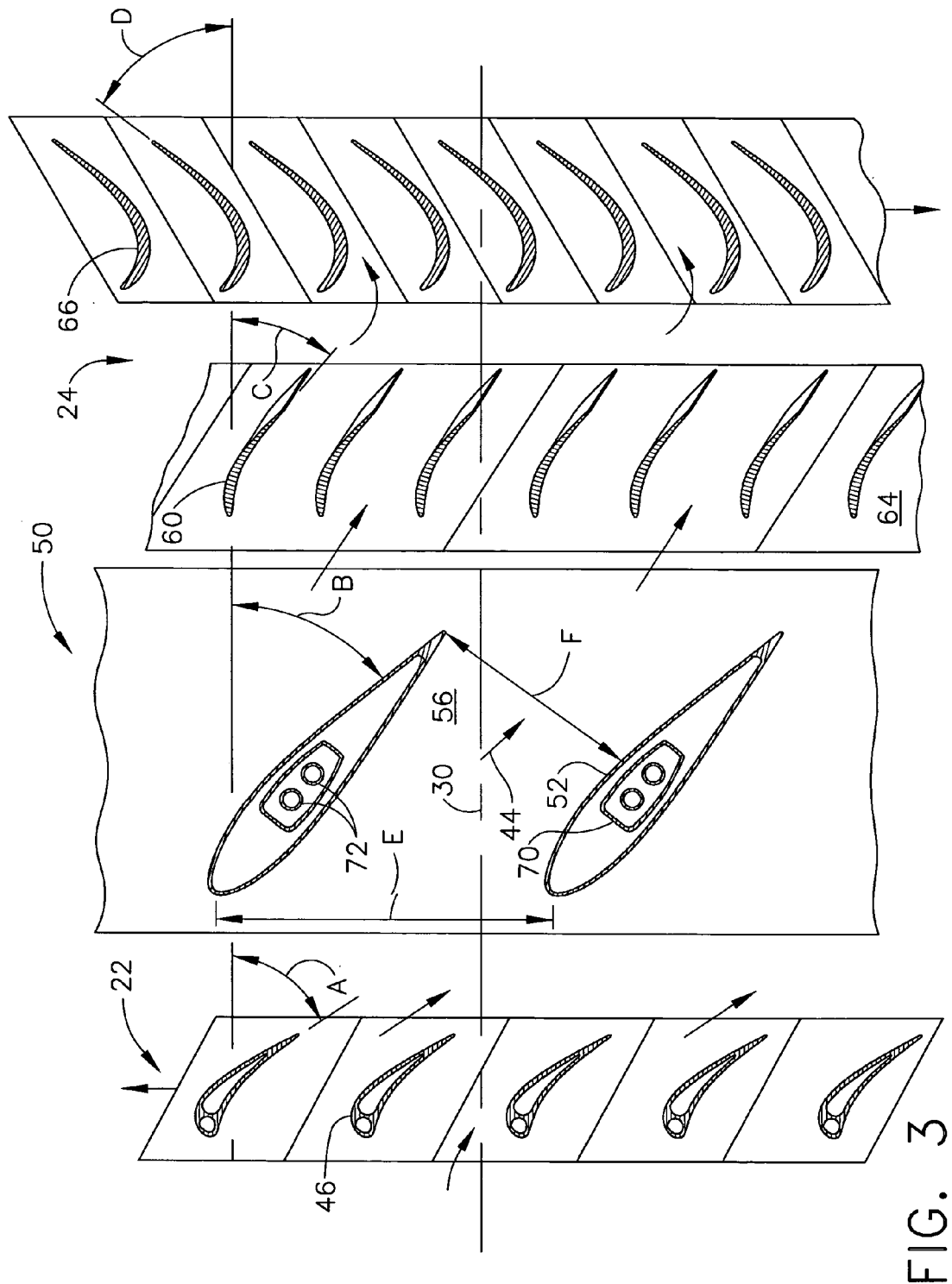
FIG. 3 is a radial planiform view of exemplary airfoils in the turbines illustrated in FIG. 2 and taken along line 3-3.

As shown in FIG. 3, the second or last stage HP blades 46 have arcuate camber and an angular orientation represented by an acute first twist angle A relative to the axial axis 30 for effecting a corresponding, non-zero or acute angle exist swirl in the combustion gases 44 discharged therefrom during operation. FIG. 3 illustrates the physical twist angle A which may be measured on the suction side of the blade at its trailing edge, or may be relative to the mean camber line extending through the center of the blade.

The row of HP blades 46 illustrated in FIG. 3 rotates in a first direction which is clockwise aft-looking-forward in the engine and will discharge the combustion gases with an absolute swirl angle which is non-zero and about 15 degrees in one example.

FIG. 2 illustrates an annular transition duct 50 disposed axially between the HPT 22 and the LPT 24 for providing an aerodynamically efficient transition of the combustion gases therebetween. The duct 50 includes a row of airfoils or fairings 52 extending radially in span between radially outwardly inclined outer and inner bands or platforms 54,56. The fairings are spaced circumferentially apart and define flow passages between the platforms through which the combustion gases are channeled directly from the last stage blades 46 of the HPT 22 and the first stage of the LPT 24. The transition duct 50 is configured to channel the combustion gases from the HPT with corresponding acute swirl to the LPT while enhancing efficiency of the turbines.

The LPT 24 is illustrated schematically in FIG. 1 and includes seven stages in the exemplary embodiment, which cooperate with the two stages of the HPT 22. FIG. 2 illustrates in more detail the first three of the seven stages of the LPT 24, with the four additional stages being similarly configured and typically increasing in size in the downstream direction.

The LPT 24 illustrated in FIG. 2 includes a first stage low pressure (LP) turbine nozzle 58 directly following the transition duct 50 in flow communication therewith. The first stage LP nozzle 58 includes a row of first stage LP stator vanes 60 extending radially in span between annular outer and inner bands 62,64. The first stage LP nozzle 58 is followed directly in turn by a row of first stage LP rotor blades 66 fixedly joined to the second rotor 28 illustrated in FIG. 1.

Since the LPT 24 illustrated in FIG. 2 includes seven exemplary stages, each stage includes a corresponding stator nozzle having vanes 60 extending radially between outer and inner bands suitably supported inside a surrounding casing of the engine. The vanes 60 typically increase in radial span from stage to stage in the downstream direction.

Following each nozzle stage in the LPT is a corresponding row of rotor blades 66 also typically increasing in radial size in the downstream direction. Each row of blades 66 typically extends radially outwardly from a supporting rotor disk, with the seven disks of the seven stages being suitably joined together, and further joined to the common second rotor 28 for powering the fan 14 during operation.

As shown in FIG. 3, the LP rotor blades 66 are oriented oppositely to the HP rotor blades 46 for counterrotating the first and second rotors 26,28 to which they are joined. Counterrotation of the rotors in the HPT 22 and LPT 24 permits a substantial increase in aerodynamic efficiency of the LPT itself as well as in the HPT which contribute to increasing the overall efficiency of the counterrotating turbofan aircraft engine illustrated in FIG. 1.

The swirl or angular flow direction of the combustion gases through the different stages of the turbines is effected by the corresponding angular orientation, profiles, and camber of the various airfoils in the flowpath of the combustion gases downstream from the combustor. Swirl is also affected by the velocity or Mach number of the combustion gases as they travel along the flowpath, and is a complex three dimensional flow with axial, tangential, and radial components.

The introduction of counterrotation in the turbines illustrated in FIG. 2 is complemented with the specific configuration and orientation of the transition duct 50 and first stage LP nozzle 58. In particular, the first stage LP nozzle 58 is higher in radial elevation than the HPT 22, including the second stage HP blades 46 therein.

Correspondingly, the transition duct 50 increases in radial elevation and flow area between the HPT 22 and the LPT 24 for maintaining, and preferably increasing, the swirl of the combustion gases as they travel between the HPT and the LPT. The radial elevation and flow area of the transition duct 50 have opposite effects on combustion gas swirl, and are collectively configured as described hereinbelow for preferentially increasing swirl for correspondingly increasing the efficiency of the turbine stages.

Each of the fairings 52 as illustrated in FIG. 3 has an acute second twist angle B, and each of the first stage LP vanes 60 has an acute third twist angle C corresponding in orientation or direction with the first twist angle A of the second stage HP blades 46.

Furthermore, the first stage LP blades 66 have an acute fourth twist angle D oriented oppositely to the twist angle C of the first stage LP vanes 60 for effecting counterrotation of the first and second rotors 26,28. In FIG. 3, the corresponding convex suction sides of the second stage HP blades 46 face upwardly for effecting clockwise rotation of the first rotor 26 aft-looking-forward. Correspondingly, the convex suction sides of the first stage LP blade 66 face downwardly for effecting counterclockwise rotation of the second rotor 28 aft-looking-forward.

The introduction of counterrotation of the two rotors in the turbofan engine permits the first stage LP vanes 60 to aerodynamically unload or reduce their loading since less flow turning is required. Correspondingly, the two stage HPT 22 need not be configured in the conventional manner for achieving substantially zero exit swirl therefrom, but instead is modified for achieving a significant amount of acute angle swirl flow therefrom.

The fairings 52 of the transition duct 50 have the acute twist angle B selected for maintaining and preferably increasing slightly the swirl of the combustion gases as they flow through the transition duct to the first stage LP nozzle 58. Since the fairings 52 are preferably symmetrical for reducing pressure losses, they have limited ability to turn the gas flow.

The twist angle C of the first stage LP vanes 60 corresponds in direction with the twist of the fairings 52 which require relatively little aerodynamic loading and turning of the combustion gases for transition into the counterrotating first stage LP blades 66.

Accordingly, the curvature and camber of the first stage LP vanes 60 may be substantially reduced over that found in a first stage LP nozzle in a turbofan engine having co-rotating rotors for the HPT and LPT.

Furthermore, the counterrotating turbines also permit a substantial reduction in turbine blade count. For example, the second stage HP blades 46 illustrated in FIG. 3 may have a total blade count substantially reduced in the counterrotating configuration as opposed to a co-rotating configuration which is about half of the total vane count of the first stage LP nozzle 58.

The total vane count of the first stage LP vanes 60 may be substantially reduced in the counterrotating configuration as opposed to a corresponding co-rotating configuration. And, the total count of the fairings 52 is substantially less than the blade and vane count, with the total count of the second stage HP blades 46 being about five times the total count of the fairings 52.

For example, there may be about twelve fairings 52 in the transition duct 50, with about five times that number of second stage HP blades 46, and about ten times that number of first stage LP vanes 60 and blades 66 in the corresponding rows. The specific number of blades, vanes, and fairings in these cooperating components is controlled by the intended thrust and efficiency requirements of the turbofan engine, but a substantial reduction of about ten percent in the number of second stage HP blades 46 may be obtained, along with a substantial reduction of fifteen to thirty percent in the number of first stage LP vanes 60 as well.

The reduction in number of airfoil count correspondingly decreases the complexity and weight and cost of the engine, and provides additional benefits in the engine. However, the primary benefit is an increase in aerodynamic efficiency.

Counterrotation of the LPT rotor permits a substantial increase in efficiency in the first stage LP nozzle 58, which in turn permits a corresponding increase in efficiency of the HPT 22 including the second stage HP blades 46 thereof. Accordingly, the aerodynamic cooperation of the HPT 22, transition duct 50, and counterrotating LPT 24 provide a synergistic increase in efficiency, while correspondingly reducing complexity and weight of the engine.

The fairings 52 illustrated in FIGS. 2 and 3 have leading edges which extend radially between the platforms 54,56 between which is defined an inlet flow area E for each flow passage. Correspondingly, each of the fairings 52 also includes a radially extending trailing edge, with the trailing edge of one fairing defining perpendicularly with an opposing side of the next fairing an outlet flow area F for each passage between the fairings.

As best shown in FIG. 2, the trailing edges of the fairings 52 are preferably disposed higher in radial elevation or height than the leading edges of the fairings, and extend in radial span or height so that the collective outlet flow area of the transition duct is greater than the collective inlet flow area of the transition duct. In this way, the swirl of the combustion gases channeled between the HPT 22 and LPT 24 may be maintained or slightly increased as the combustion gases are channeled and radially expand through the transition duct.

In general, increasing the radius of the transition duct decreases swirl of the combustion gases therein, while increasing the flow area through the transition duct increases swirl therethrough. However, the area increased through the transition duct should not be excessive which would lead to flow separation and a substantial loss in turbine efficiency.

As shown in FIG. 2, the fairings 52 have a radial span or height G at their leading edges between the outer and inner platforms 54,56, and a corresponding radial span or height H at the trailing edges between the platforms. The radial span H of the fairing trailing edges is preferably less than or equal to the radial span G of the fairing leading edges since the outer and inner platforms 54,56 are inclined or sloped radially outwardly in the aft direction. In this way, the increase in outlet area of the radially diverging transition duct may be reduced by decreasing the radial span of the fairing trailing edges.

The transition duct 50 provides a substantial increase in radius of the flowpath between the high and low pressure turbines, with the trailing edges of the fairings 52 at the inner platform 56 being higher in radial elevation than the leading edges of the fairings at the outer platform 54 in the preferred embodiment illustrated in FIG. 2. Correspondingly, the first stage LP nozzle 58 is disposed downstream from the transition duct at an even higher radial elevation which positions the LP nozzle 58 substantially greater in elevation than the HPT 22, including the last stage rotor blades 46 thereof.

Furthermore, the first five stages of the LPT 24, three of which are illustrated in FIG. 2, continue this pattern of increasing radial elevation of vanes 60 and blades 66 thereof in the downstream direction. Both the inner and outer boundaries of the flowpath along the LPF vanes and blades continue to increase in radial elevation for the first five stages thereof before leveling out to the last two stages thereof for further enhancing efficiency of the LPT.

In view of the substantial radial increase in elevation between the HPT 22 and LPT 24 illustrated in FIG. 2, the first stage LP vanes 60 may be tilted in the upstream or forward direction at the outer band 62 for further increasing aerodynamic efficiency of the turbine. Since counterrotation operation of the LPT rotor substantially reduces the turning requirement for the first stage LP nozzle 58, the aerodynamic loading thereof is also reduced, which correspondingly permits a reduction in the axial width of the vanes 60 preferentially effected where they join the radially outer band 62.

The outer and inner bands 62,64 of the first stage LP nozzle 58 are both inclined radially outwardly between the leading and trailing edges of the vanes 60 as illustrated in FIG. 2 to continue the radial rise of the flowpath from the transition duct 50, and the continued radial expansion of the combustion gases. Correspondingly, the trailing edges of the first stage vanes 60 are disposed higher in radial elevation at the outer band 62 than the leading edges of the same vanes 60 at the outer bands.

Furthermore, the trailing edges of the first stage LP vanes 60 are preferably tilted upstream or forward at the outer band 62 and are oriented more obliquely to the inclined outer band 62 and to the streamlines of the combustion gases which flow axially and radially through the inclined first stage nozzle 58. The first stage vanes 60 have an axial width at the outer band 62 which is preferably no greater than about the axial width of the vane 60 at the inner band 64. This minimizes the size of the first stage nozzle 58 and its axial width, and correspondingly reduces the length of the entire turbofan engine, which in turn reduces weight thereof.

The transition duct 50 illustrated in FIG. 2 provides a convenient location for introducing a midframe 68 that is disposed between the HPT 22 and the LPT 24 and which may be conveniently used for supporting bearings for mounting the rotor shafts. The midframe 68 includes a plurality of hollow struts 70, each of which extends radially through corresponding ones of the fairings 52 as additionally illustrated in FIG. 3.

The fairings 52 are sufficiently wide at the struts 70 and have a generally symmetrical profile which converges from maximum width just behind the leading edge thereof to the narrow trailing edge extending toward the first stage LP nozzle 58. The struts 70 are radially rigid for supporting the rotor bearings, and are hollow for carrying one or more tubes 72 for conveniently carrying conventional fluids through the hot combustion flowpath. For example, the tubes 72 may be used for channeling cooling or purge air into the core engine within the various rotor cavities.

The struts 70 may be located at the forward end of fairings 52, with the fairings extending in axial length to bridge the transition between the HPT and the LPT and the substantial radial increase in elevation shown in FIG. 2.

The transition duct 50 and first stage LP nozzle 58 cooperate with the counterrotation of the rotors in the high pressure and low pressure turbines for providing a substantial increase in efficiency of the LPT, and in turn the HPT, with a corresponding reduction in airfoil count as indicated above. Aerodynamic efficiency may therefore be improved, weight may be reduced, and the resulting counterrotating turbofan aircraft engine may enjoy further advantage in propelling aircraft in flight with a substantial reduction in fuel consumption.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbofan engine comprising:
   a fan, compressor, combustor, high pressure (HP) turbine (HPT), and multistage low pressure (LP) turbine (LPT) joined in serial flow communication for sequentially pressurizing air in said fan and compressor to generate combustion gases in said combustor from which energy is extracted in said HPT and LPT;
   said compressor being joined to said HPT by a first rotor, and said fan being joined to said LPT by a second rotor;
   said HPT including two stages of HP rotor blades therein joined to said first rotor, with the second stage HP blades having an acute twist angle to effect a corresponding acute angle exit swirl in said combustion gases discharged therefrom;
   a transition duct disposed between said HPT and LPT, and including a row of fairings extending radially in span between radially outwardly inclined outer and inner platforms for channeling said combustion gases from said HPT to said LPT with corresponding acute swirl;
   said LPT including a first stage LP nozzle directly following said transition duct and being higher in radial elevation than said second stage HP blades, and having a row of first stage LP vanes extending radially in span between outer and inner bands, and followed in turn by a row of first stage LP blades joined to said second rotor; and
   said LP blades being oriented oppositely to said HP blades for counterrotating said first and second rotors.

2. An engine according to claim 1 wherein:
   said fairings have leading edges and a collective inlet flow area therebetween, and trailing edges and a collective outlet flow area therebetween; and
   said trailing edges of said fairings are higher in radial elevation than said leading edges, and extend in radial span so that said outlet flow area is greater than said inlet flow area for increasing swirl of said combustion gases between said HPT and said LPT.

3. An engine according to claim 2 wherein:
   said fairings have an acute twist angle, and said first stage LP vanes have an acute twist angle corresponding in orientation with said twist angle of said second stage HP blades; and
   said first stage LP blades have an acute twist angle oriented oppositely to said first stage LP vanes for effecting counterrotation of said first and second rotors.

4. An engine according to claim 3 further comprising a midframe disposed between said HPT and said LPT, and including a plurality of struts extending radially through corresponding ones of said fairings, and said fairings are wide at said struts and converge aft toward said first stage LP nozzle.

5. An engine according to claim 4 wherein said fairing trailing edges at said inner platform are higher in radial elevation than said fairing leading edges at said outer platform.

6. An engine according to claim 5 wherein:
said outer and inner bands of said first stage LP nozzle are inclined radially outwardly between leading and trailing edges of said vanes; and
said trailing edges of said vanes are disposed higher in radial elevation at said outer band than said leading edges thereof.

7. An engine according to claim 6 wherein said trailing edges of said first stage LP vanes are tilted upstream at said outer band, and said vanes have an axial width at said outer band being no greater than about the axial width of said vanes at said inner band.

8. An engine according to claim 6 wherein said fairing trailing edges are shorter in radial span than said fairing leading edges.

9. An engine according to claim 6 wherein said second stage HP blades have a total blade count about half of the total vane count of said first stage LP nozzle and about five times the total fairing count of said transition duct.

10. An engine according to claim 6 further comprising:
a fan nacelle surrounding said fan and having a fan outlet; and
a core cowl surrounding said compressor, combustor, HPT, and LPT, and having a core outlet, said cowl extending through said nacelle to define a bypass duct terminating at said fan outlet forward of said core outlet.

11. A turbofan engine comprising:
a fan, compressor, combustor, high pressure (HP) turbine (HPT), and multistage low pressure (LP) turbine (LPT) joined in serial flow communication for sequentially pressurizing air in said fan and compressor to generate combustion gases in said combustor from which energy is extracted in said HPT and LPT;
said compressor being joined to said HPT by a first rotor, and said fan being joined to said LPT by a second rotor;
said HPT including two stages of HP rotor blades therein joined to said first rotor, with the second stage HP blades having an acute twist angle to effect a corresponding acute angle exit swirl in said combustion gases discharged therefrom;
a transition duct disposed between said HPT and LPT, and including a row of fairings extending radially in span between radially outwardly inclined outer and inner platforms for channeling said combustion gases from said HPT to said LPT with corresponding acute swirl;
said LPT including a first stage LP nozzle directly following said transition duct and having a row of first stage LP vanes extending radially in span between outer and inner bands, and followed in turn by a row of first stage LP blades joined to said second rotor; and
said LP blades being oriented oppositely to said HP blades for counterrotating said first and second rotors.

12. An engine according to claim 11 wherein:
said first stage LP nozzle is higher in radial elevation than said second stage HP blades; and
said transition duct increases in radial elevation and flow area between said HPT and said LPT for increasing swirl of said combustion gases therebetween.

13. An engine according to claim 12 wherein:
said fairings have an acute twist angle, and said first stage LP vanes have an acute twist angle corresponding in orientation with said twist angle of said second stage HP blades; and
said first stage LP blades have an acute twist angle oriented oppositely to said first stage LP vanes for effecting counterrotation of said first and second rotors.

14. An engine according to claim 13 wherein:
said fairings have leading edges and a collective inlet flow area therebetween, and trailing edges and a collective outlet flow area therebetween; and
said trailing edges of said fairings are higher in radial elevation than said leading edges, and extend in radial span so that said outlet flow area is greater than said inlet flow area.

15. An engine according to claim 14 wherein said fairing trailing edges are shorter in radial span than said fairing leading edges.

16. An engine according to claim 14 wherein said fairing trailing edges at said inner platform are higher in radial elevation than said fairing leading edges at said outer platform.

17. An engine according to claim 14 wherein said first stage LP vanes are tilted upstream at said outer band.

18. An engine according to claim 17 wherein:
said outer and inner bands of said first stage LP nozzle are inclined radially outwardly between leading and trailing edges of said vanes; and
said trailing edges of said vanes are disposed higher in radial elevation at said outer band than said leading edges thereof.

19. An engine according to claim 18 wherein said trailing edges of said first stage LP vanes are tilted upstream at said outer band, and said vanes have an axial width at said outer band being no greater than about the axial width of said vanes at said inner band.

20. An engine according to claim 14 further comprising a midframe disposed between said HPT and said LPT, and including a plurality of struts extending radially through corresponding ones of said fairings, and said fairings are wide at said struts and converge aft toward said first stage LP nozzle.

21. An engine according to claim 14 wherein said second stage HP blades have a total blade count about half of the total vane count of said first stage LP nozzle and about five times the total fairing count of said transition duct.

* * * * *

UNITED STATES PATENT AND TRADEMARK OFFICE
CERTIFICATE OF CORRECTION

PATENT NO. : 7,594,388 B2  Page 1 of 1
APPLICATION NO. : 11/145848
DATED : September 29, 2009
INVENTOR(S) : Cherry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1150 days.

Signed and Sealed this

Fourteenth Day of December, 2010

David J. Kappos
*Director of the United States Patent and Trademark Office*